(12) United States Patent  
Panttaja et al.

(10) Patent No.: US 9,137,648 B2  
(45) Date of Patent: Sep. 15, 2015

(54) PERIPHERAL COMPUTING DEVICE

(71) Applicant: VOXER IP LLC, San Francisco, CA (US)

(72) Inventors: James T. Panttaja, San Francisco, CA (US); Mary G. Panttaja, San Francisco, CA (US); Irvin J. F. Remedios, San Francisco, CA (US)

(73) Assignee: VOXER IP LLC, San Francisco, CA (US)

( * ) Notice: Subject to any disclaimer, the term of this patent is extended or adjusted under 35 U.S.C. 154(b) by 0 days.

(21) Appl. No.: 14/463,408

(22) Filed: Aug. 19, 2014

(65) Prior Publication Data

US 2015/0072658 A1    Mar. 12, 2015

Related U.S. Application Data

(60) Provisional application No. 61/877,259, filed on Sep. 12, 2013.

(51) Int. Cl.
*H04M 1/725* (2006.01)
*H04W 4/12* (2009.01)

(52) U.S. Cl.
CPC ............ *H04W 4/12* (2013.01); *H04M 1/72547* (2013.01)

(58) Field of Classification Search
CPC ..................... H04M 2250/60; H04M 1/72597; H04M 7/0057; H04W 4/12
USPC ........................................... 455/412.1, 412.2
See application file for complete search history.

(56) References Cited

U.S. PATENT DOCUMENTS

| 6,678,720 | B1 * | 1/2004 | Matsumoto et al. | 709/204 |
| 2005/0091407 | A1 * | 4/2005 | Vaziri et al. | 709/246 |
| 2013/0226678 | A1 * | 8/2013 | Perna | 705/14.4 |
| 2014/0006148 | A1 * | 1/2014 | Perna | 705/14.49 |

* cited by examiner

*Primary Examiner* — Don N Vo  
(74) *Attorney, Agent, or Firm* — Beyer Law Group LLP (57) ABSTRACT

One aspect of the invention pertains to a peripheral computing device. The peripheral computing device is configured to connect with a primary computing device, such as a mobile phone or computer. The peripheral computing device is configured to access and manage incoming and outgoing messages on the primary computing device.

20 Claims, 8 Drawing Sheets

PERIPHERAL COMPUTING DEVICE

CROSS REFERENCE TO RELATED APPLICATIONS

This application claims the benefit of priority to U.S. Provisional Patent Application No. 61/877,259, filed on Sep. 12, 2013, which is incorporated herein by reference in its entirety for all purposes.

FIELD OF THE INVENTION

The present invention pertains to communications, and more particularly, to a wearable or peripheral computing device that interacts with a primary computing device to deliver incoming messages, alerts, notifications or other types of information to a user.

BACKGROUND OF THE INVENTION

There are a wide variety of communication systems for mobile and computing devices. Some popular examples including instant messaging, email, phone calls, texting and Voice over IP (VoIP).

The assignees of the present application have developed a new type of media messaging system that progressively stores messages as they are being created, sent or received. As a result, users can seamlessly move between a real time mode, in which messages are reviewed as they are being received, and a time-shifted mode, in which previously received or sent messages are selectively rendered. Various implementations of this approach are described in several patent applications, including U.S. patent application Ser. No. 13/555,034 (hereinafter referred to as the '034 application) and Ser. No. 13/466,011 (hereinafter referred to as the '011 application), each of which is incorporated herein by reference in its entirety for all purposes.

A wide variety of different mobile devices, including laptops, tablets and smartphones, are capable of using the above systems. Some mobile devices are configured to communicate wirelessly with nearby peripheral devices. For example, various types of smartphones use a short-range network, such as BLUETOOTH, to communicate with a peripheral device such as a headset, a smartwatch or a vehicle dashboard. The peripheral device is then able to display or access information stored on the smartphone.

SUMMARY OF THE INVENTION

One aspect of the invention pertains to a peripheral computing device. The peripheral computing device is configured to connect with a primary computing device, such as a mobile phone or computer. The peripheral computing device is configured to access and manage incoming and/or outgoing messages on the primary computing device.

The peripheral computing device may take a wide variety of forms, depending on the needs of a particular application. In some embodiments, for example, the peripheral computing device is a computer watch, a heads up display, a pair of computer glasses or a display device, which is installed on an appliance or the dashboard of a vehicle. A user is able to use the peripheral computing device to access the primary computing device. Using the peripheral computing device, the user can create and send messages, review stored messages, move between real time and time shifted modes, and/or review the message history of a conversation between the user and one or more other participants.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The present invention relates generally to communications. In particular, the present application pertains to a peripheral computing device that connects via a short range network to a primary computing device. The primary computing device, which in some embodiments is a smartphone, is capable of receiving and transmitting messages, such as voice, text and video media. The peripheral computing device, which includes but is not limited to a computer watch, computer glasses or any other suitable wearable technology, is used to control and interact with the primary computing device.

The present invention contemplates that the primary computing device is configured to implement a novel type of telecommunications and media management system, which has been described in multiple, co-assigned patent applications, including the '034 application. Various implementations of the system have been referred to as "Voxing." To use a simple example of a Voxing application, a computing device (e.g., a smartphone) receives a message (e.g., an incoming Vox or call) and progressively stores the message while it is being received. When a user is sending a message (e.g., an outgoing Vox), the device also progressively stores the message while it is being created and sent. The stored messages are threaded to form a message history for a conversation between a user of the device and one or more other participants. This storage feature enables two modes of operation for the user, a real time mode and a time-shifted mode. In the real time mode, a user of the device can receive and listen to calls in (near) real time, similar to an ordinary cell phone. In the time-shifted mode, the user can selectively render and review any stored messages. In some implementations, the Voxing application allows the user to seamlessly switch between the two modes at any time.

The above functionality can be implemented in a variety of devices, including smartphones. In some cases, however, it is more convenient to access the above features and options using a peripheral computing device. Consider an example in which a user receives a Vox or call on a smartphone that is in the user's pocket. To identify the caller, participate in a conversation, engage in a real time mode or access a time-shifted mode, the user will have to remove the smartphone from his or her pocket and possibly interact with the screen or buttons of the smartphone. If the user had a more immediately accessible peripheral device, such as a computer watch or a head-mounted computing device, the user could access the Voxer application with less effort.

Figure 1:
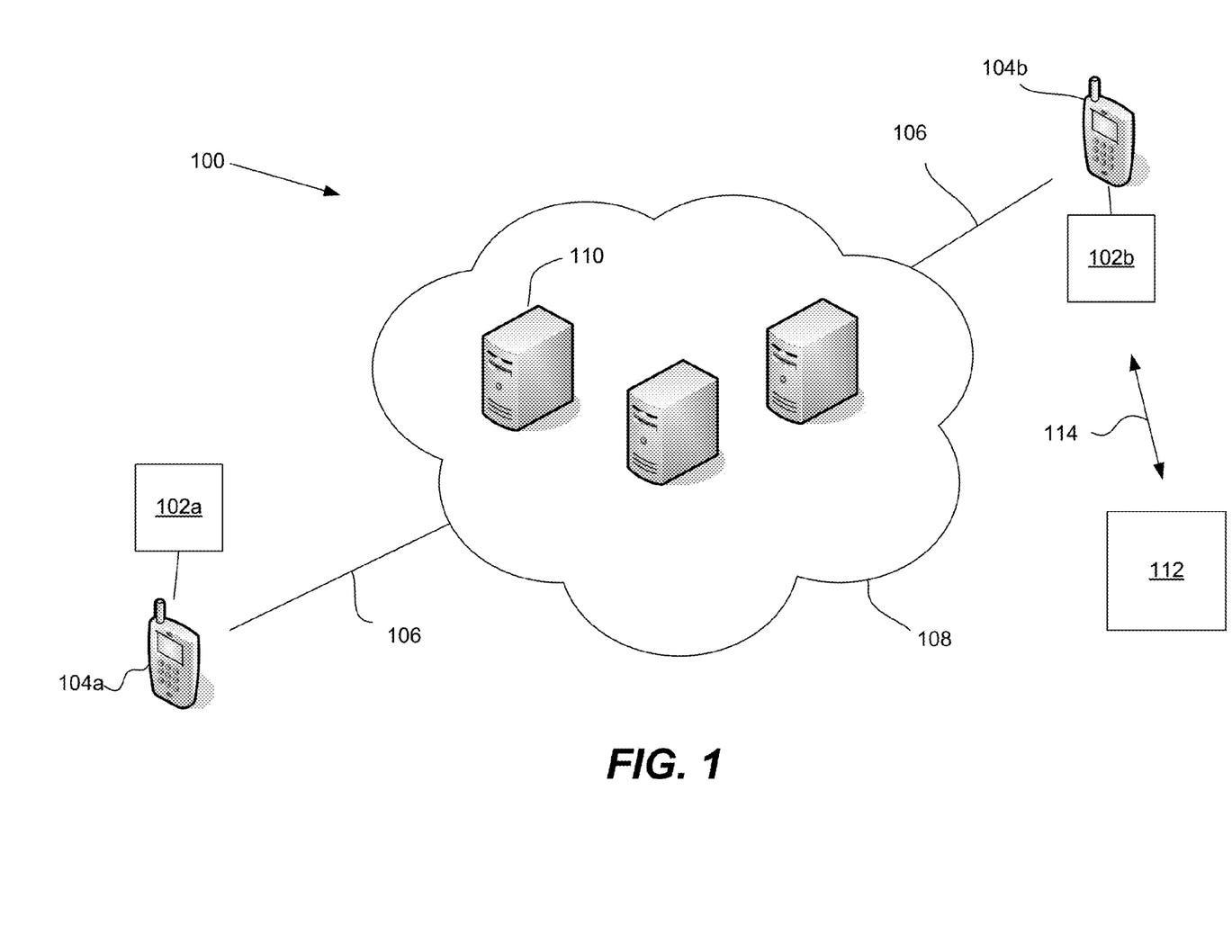
FIG. 1 is a diagram of a communication and media management system according to a particular embodiment of the present invention.

The present invention contemplates a variety of mechanisms for controlling a primary computing device using a peripheral computing device. Referring initially to FIG. 1, a block diagram of a telecommunication and media management system 100 according to one embodiment of the present invention is shown. The system 100 includes clients 102a/102b that run on primary computing devices 104a/104b and a peripheral computing device 112, which is connected via a short-range network 114 to the primary computing device 104b. The primary computing devices 104a/104b communicate with one another through one or more networks 106 that connect the devices 104a/104b to a communication services network 108. The communications services network 108 includes servers 110. In various embodiments, the networks 106 may be the Public Switched Telephone Network (PSTN), a cellular network based on CDMA or GSM or any other suitable protocol, the Internet, a tactical radio network or any other communication network.

In this example, device 104a is sending a message or media stream to device 104b. For example, a camera, microphone or other media capturing tool on the device 104a may be used to obtain video, sound or images. This media is then streamed (e.g., progressively created and transmitted at the same time) to the device 104b. The generation, sending, storage and receiving of the media may be performed in a wide variety of ways. For example, the clients 102a/102b and devices 104a/104b may communicate in any manner described in the '034 and '011 applications. In the illustrated embodiment, the media is streamed to one or more servers 110, which in turn store the media and stream it to the device 104b for rendering.

The peripheral computing device 112 is connected via a suitable network 114 to the primary computing device 104b. The peripheral computing device 112 exchanges data with the primary computing device 104b using any suitable network protocol or mechanism. In various embodiments, for example, a short-range wireless network such as BLUE-TOOTH is used.

The primary computing device 104b may be any suitable device that is capable of transmitting and/or receiving messages over the network 108. In various implementations, the primary computing device 104b includes but is not limited to a smartphone, a computer and a tablet. Additionally, the primary computing device 104b may include a wide variety of features, including any module or feature described with respect to client 12 and device 13 of the '034 application.

Figure 2:
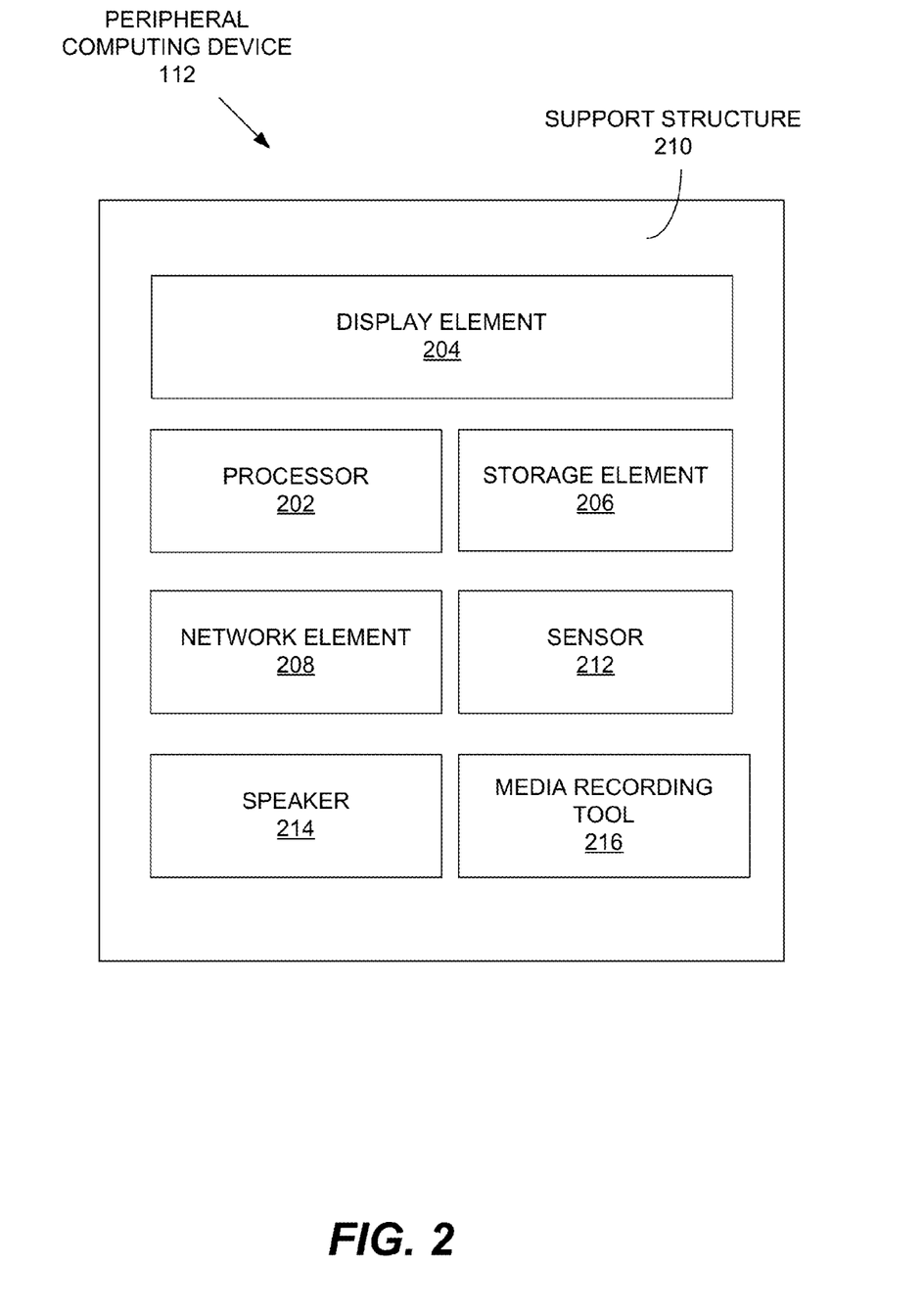
FIG. 2 is a block diagram of a peripheral computing device according to a particular embodiment of the present invention.

Referring next to FIG. 2, a block diagram of a peripheral computing device 112 of FIG. 1 will be described. The peripheral computing device 112 includes a support structure 210, a display element 204, a network element 208, a storage element 206, a processor 202, a sensor 212, a speaker 214 and a media recording tool 216.

Figure 7:
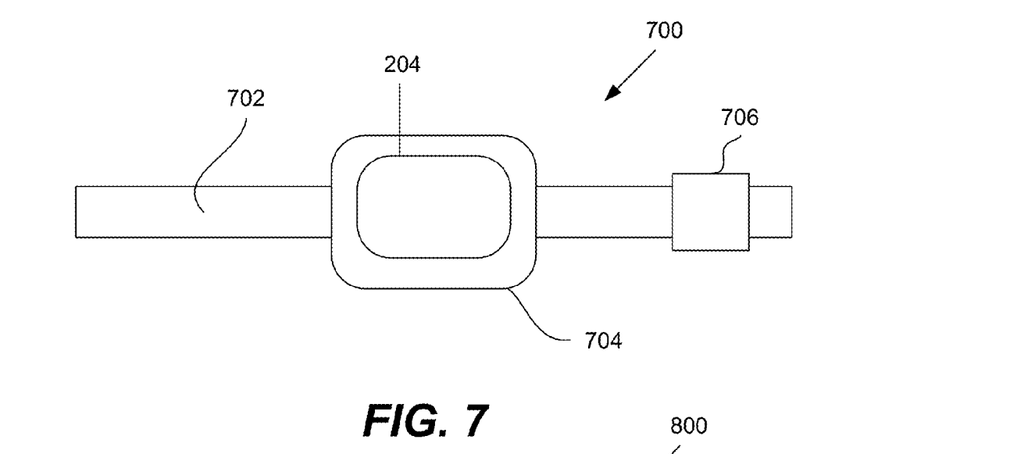
FIG. 7 is a block diagram of a computer watch according to a particular embodiment of the present invention.

The support structure 210 is any suitable structure that physically supports the electrical and computer components of the peripheral computing device 112. Depending on the nature of the peripheral computing device, the support structure 210 may vary widely in terms of its form factor, design and geometry. In some embodiments, for example, the peripheral computing device is a watch. An example of such a watch 700 is shown in FIG. 7. In the illustrated embodiment, the support structure 210 includes a band 702 that is arranged to loop around and be secured to the wrist of a person. The band physically supports a hardware element 704 that includes the display element 204, the processor 202, the storage element 206 and the sensor 212. The band may be made of any suitable flexible material 702 and is secured using a latch 706 or any other known type of fastening mechanism.

Figure 8A:
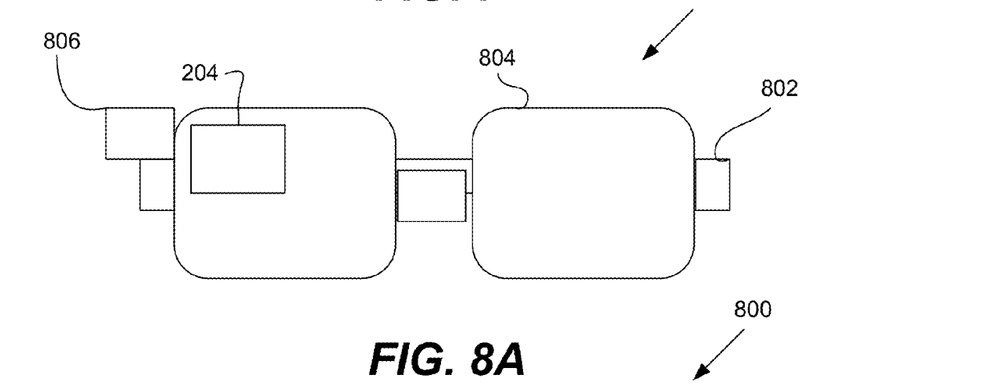
FIGS. 8A and 8B are front and top views of computer glasses according to a particular embodiment of the present invention.
Figure 8B:
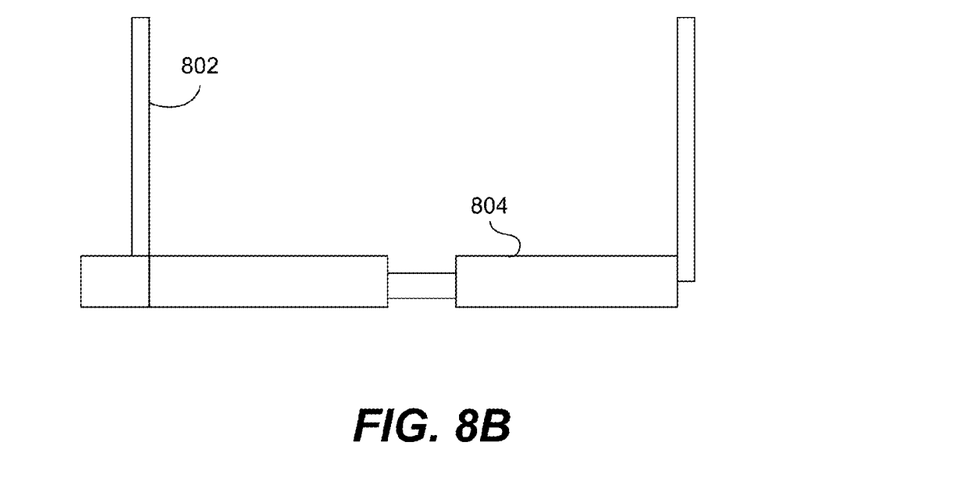

In still another embodiment, the peripheral computing device 112 is a head-mounted device, such as a pair of glasses with a heads up display. An example of such a pair of glasses 800 is shown in FIGS. 8A and 8B, which are front and top views of the glasses 800. In this embodiment, the support structure 210 are frames 802 that are arranged to be secured to a person's ears or head and that physically support a pair of at least partially transparent lenses 804. The frames 802, when worn on the head of a person, are configured to position the lenses 804 over the eyes of the person. The frames 802 support a hardware element 806 that contains the other electronic components of the peripheral computing device (e.g., the display element 204, the processor 202, the storage element 206, etc.) In some embodiments, the hardware element 806 includes or is attached to a heads up display projector that is configured to project a user interface (e.g., user interfaces 500 and 600 of FIGS. 5 and 6) onto a display element 204, which is mounted on the lenses 804 and which may be made of any suitable medium (e.g., a prism, a portion of the lenses 804, etc.) As a result, a person wearing the glasses 800 can view his environment through the lenses 804 while simultaneously viewing the projected user interface.

Figure 9A:
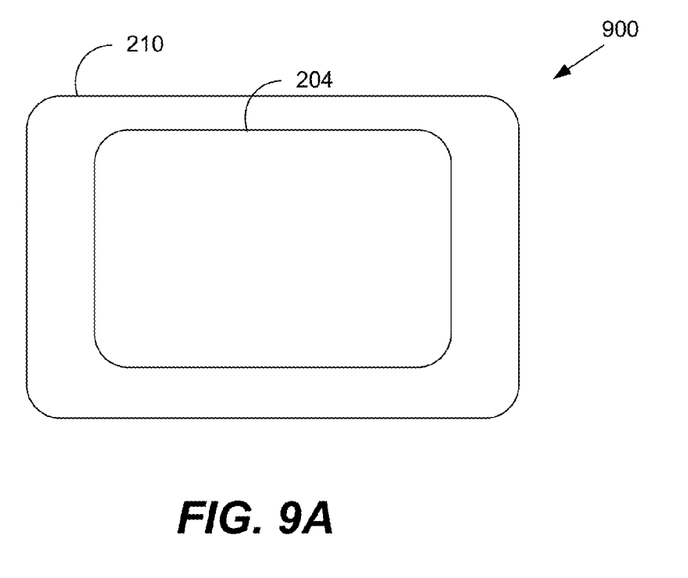
FIG. 9A is a block diagram of a display device according to a particular embodiment of the present invention.
Figure 9B:
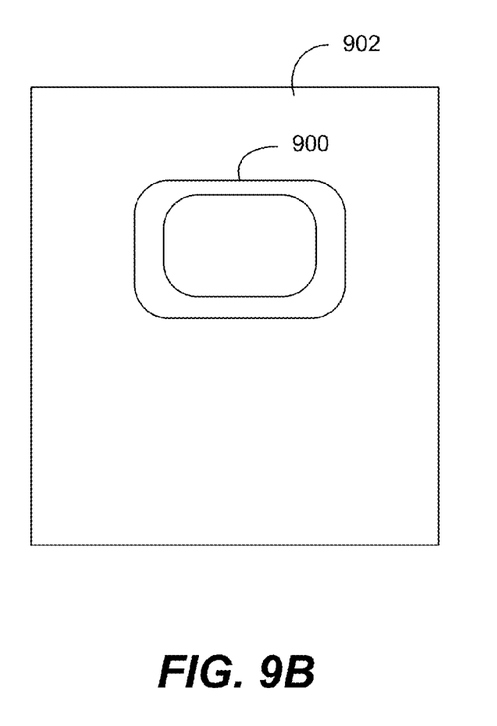
FIG. 9B is a block diagram of the display device of FIG. 9A attached to a structure according to a particular embodiment of the present invention.

In yet another embodiment, the peripheral computing device 112 is a display device. An example of such a display device 900 is shown in FIGS. 9A and 9B. The support structure 210 in this case is any suitable medium or structure (e.g., a metal or plastic case, etc.) that supports, covers, encases and/or helps physically secure the components of the peripheral computing device 112 (e.g., the display element 204, the processor 202, the storage element 206, etc.) to a suitable surface or structure 902, such as the dashboard of a car, a refrigerator, a door or a wall. In the illustrated embodiment, the display device 900 includes a display screen (display element 204) that is arranged to display a suitable user interface (e.g., user interfaces 500 and 600 of FIGS. 5 and 6.) It should be appreciated that the support structure 210 is not limited to the above descriptions and may be modified to suit the needs of a wide variety of applications.

Figure 5:
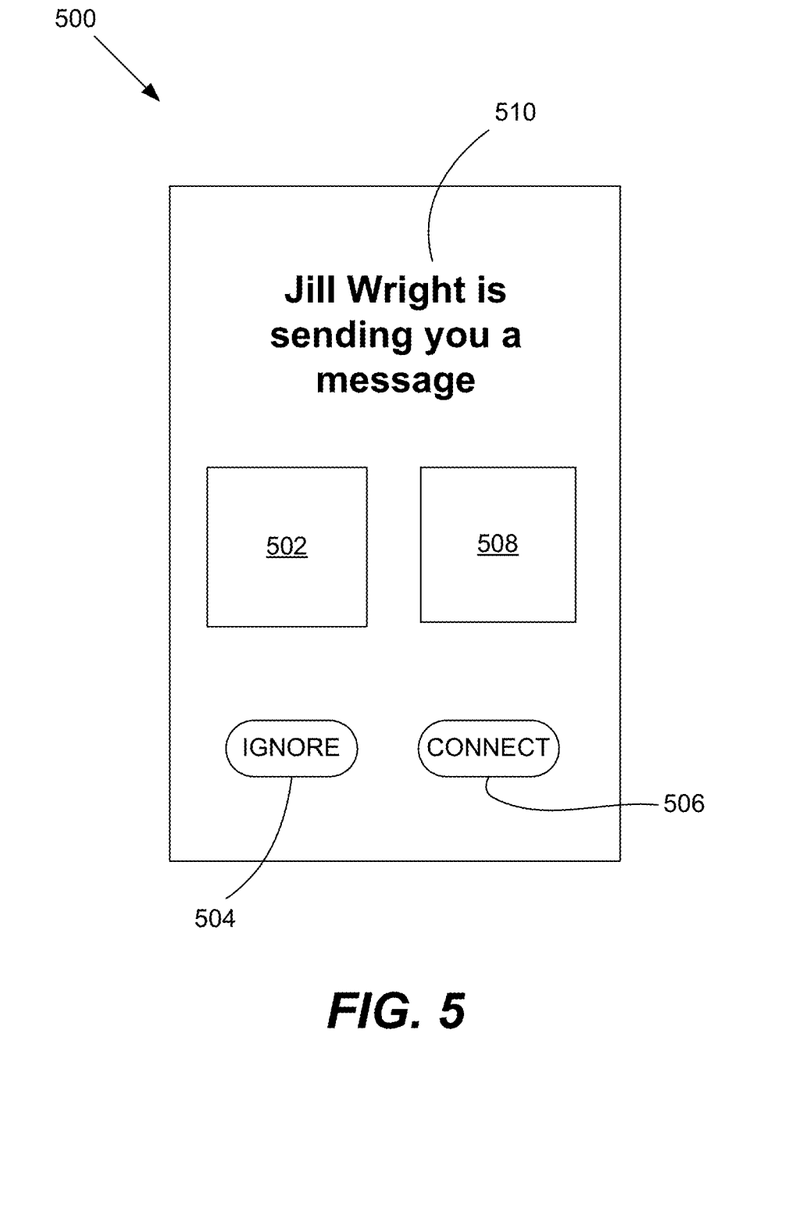
FIGS. 5 and 6 are block diagrams of example interfaces according to a particular embodiment of the present invention.
Figure 6:
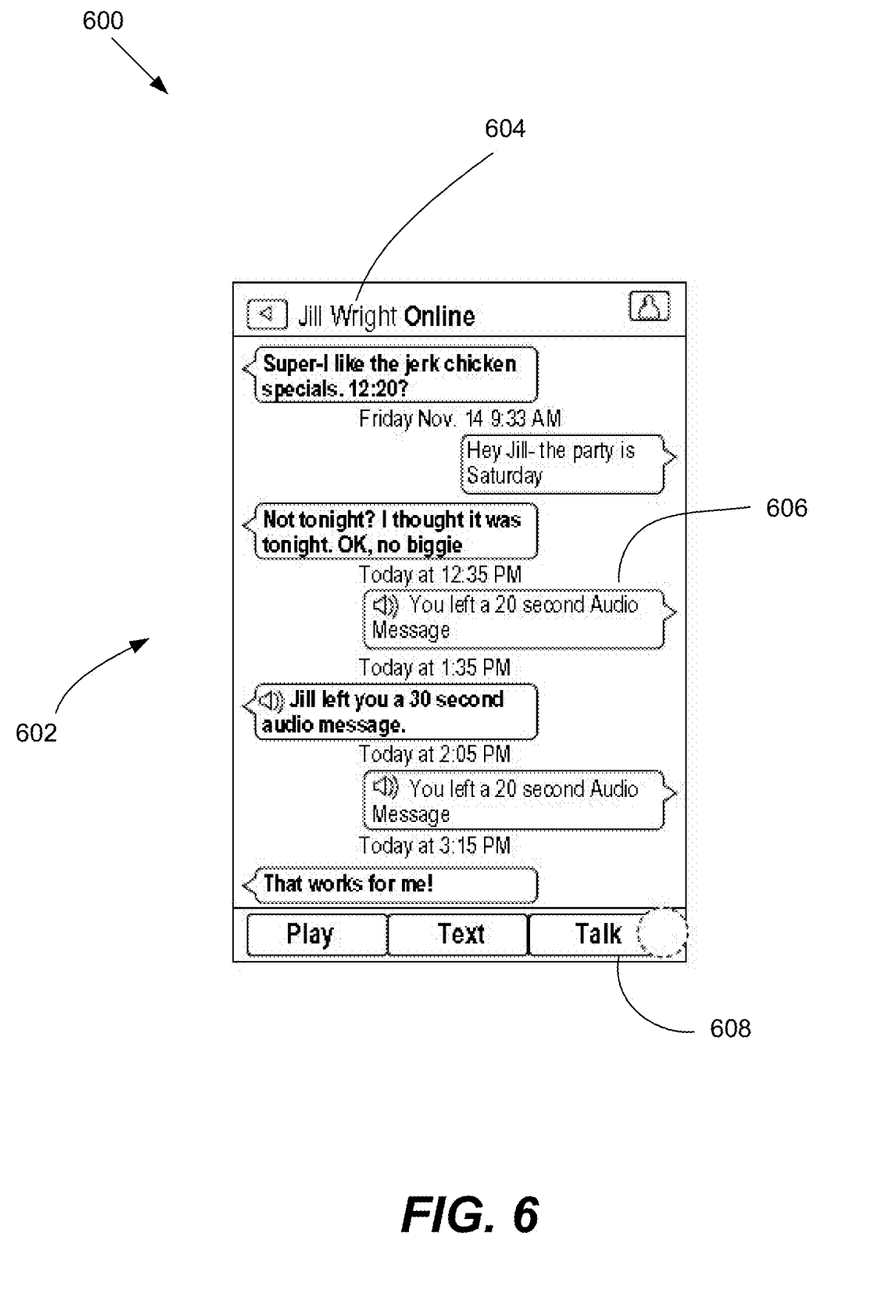

Returning to FIG. 2, the display element 204 is arranged to generate or display a user interface (e.g., the user interfaces 500 and 600 of FIGS. 5 and 6.) The design of the display element may vary depending on the nature of the peripheral computing device 112. For example, when the peripheral computing device is a display device or a watch, the display element 204 may be an LCD screen, an electronic screen, a video display screen, a touch-sensitive capacitive screen, an electronic paper display or any other known display technology. If the peripheral computing device is a heads up display device, computer glasses or a head-mounted computing device, the display element may be a projector arranged to project the user interface onto a suitable medium and/or a medium that receives the projection (e.g., such as the windshield of a car, a prism, a lens of a pair of glasses, etc. Any known form of heads up display technology may be used in the display element 204.

The network element 208 is any software and hardware suitable for connecting with the peripheral computing device 112 with the primary computing device 104b. The network element 208 receives data from and sends data to the primary computing device 104b.

The storage element 206 is a computer readable medium that contains computer code. The code may be stored in any suitable physical medium, including but not limited to RAM, flash memory, hard drives, optical media, volatile memory, non-volatile memory or some combination thereof. The computer code provides instructions for operating the features and functionality of the peripheral computing device 112. Based on the data received through the network element 208 and/or the code in the storage element 206, the processor 202 causes the peripheral computing device to perform one or more of the steps illustrated in FIGS. 3 and 4.

The peripheral computing device 112 also includes an optional sensor 212. Any known motion or environmental sensor may be used. For example, the present invention contemplates a peripheral computing device 112 that is wearable (e.g., a computer watch) and that includes a motion sensor, such as an accelerometer. The motion sensor detects the motion of the peripheral computing device 112 and transmits the corresponding motion data to the processor 202. The processor 202 determines whether the motion exceeds a predefined toggle threshold or meets a predefined motion criteria. If that is the case, a particular feature may be toggled or activated. In some embodiments, for example, a wave or twist of a suitably designed computer watch allows a user to create a message, pick up an incoming call, enter real time mode and/or trigger any other operation without requiring the user to directly interact with the primary computing device 104b. Various motion determination techniques are described in U.S. Provisional Patent Application No. 61/833,645 (referred hereinafter as the '645 application), which is incorporated herein in its entirety for all purposes. The present invention contemplates using any of the motion determination techniques described in the '645 application to trigger or activate any of the operations described herein.

The peripheral computing device 112 also optionally includes one or more components that allow a user to listen to and create messages. In the illustrated embodiment, for example, the peripheral computing device includes a speaker 214 and a media recording tool 216. The speaker 214 enables a user to listen to incoming or pre-recorded messages. The media recording tool 216 is any mechanism or tool, such as a camera and/or a microphone, which can be used to create a message (e.g., audio, video, image, etc.) for delivery to another user or device.

Figure 3:
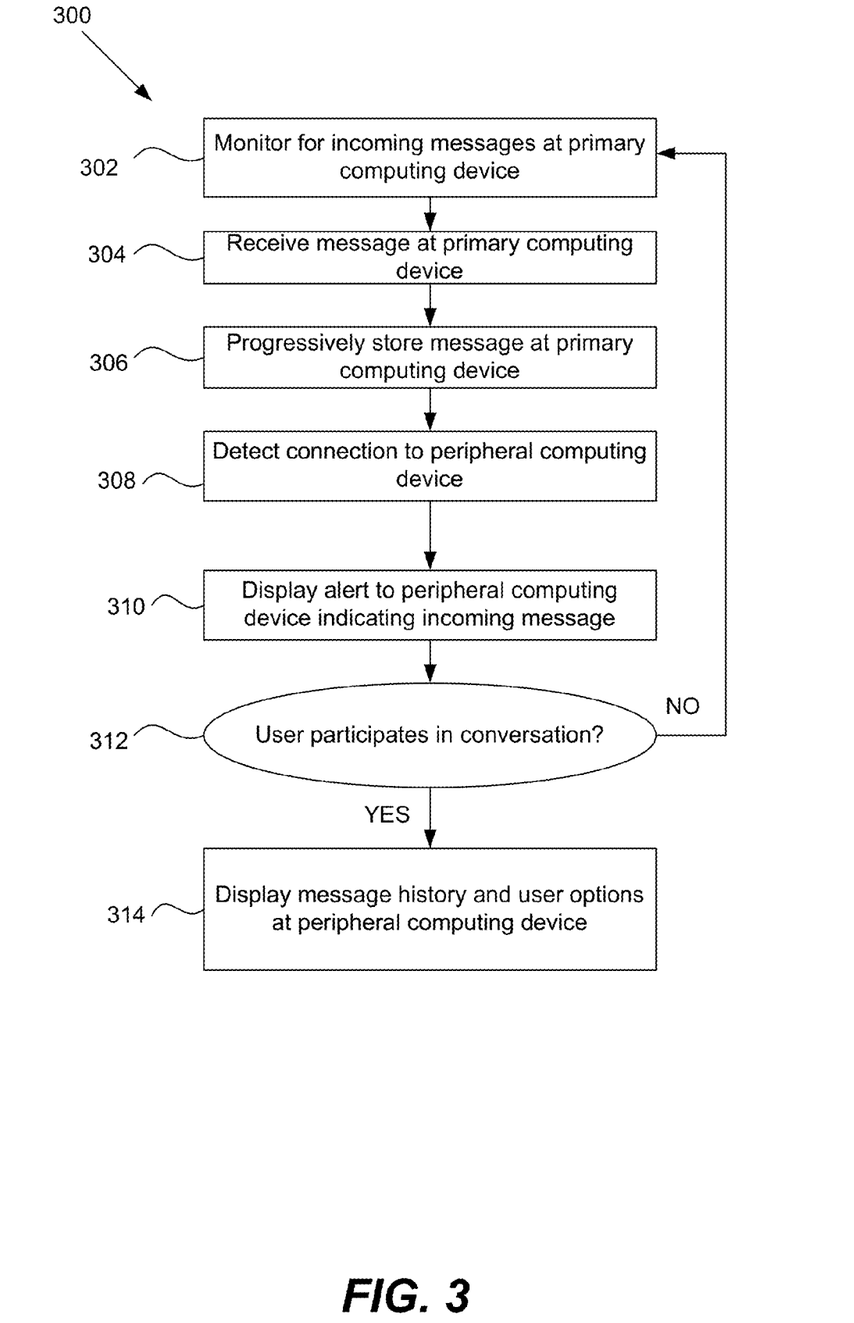
FIGS. 3 and 4 are flow diagrams of a method for using a peripheral computing device to manage communications according to a particular embodiment of the present invention.
Figure 4:
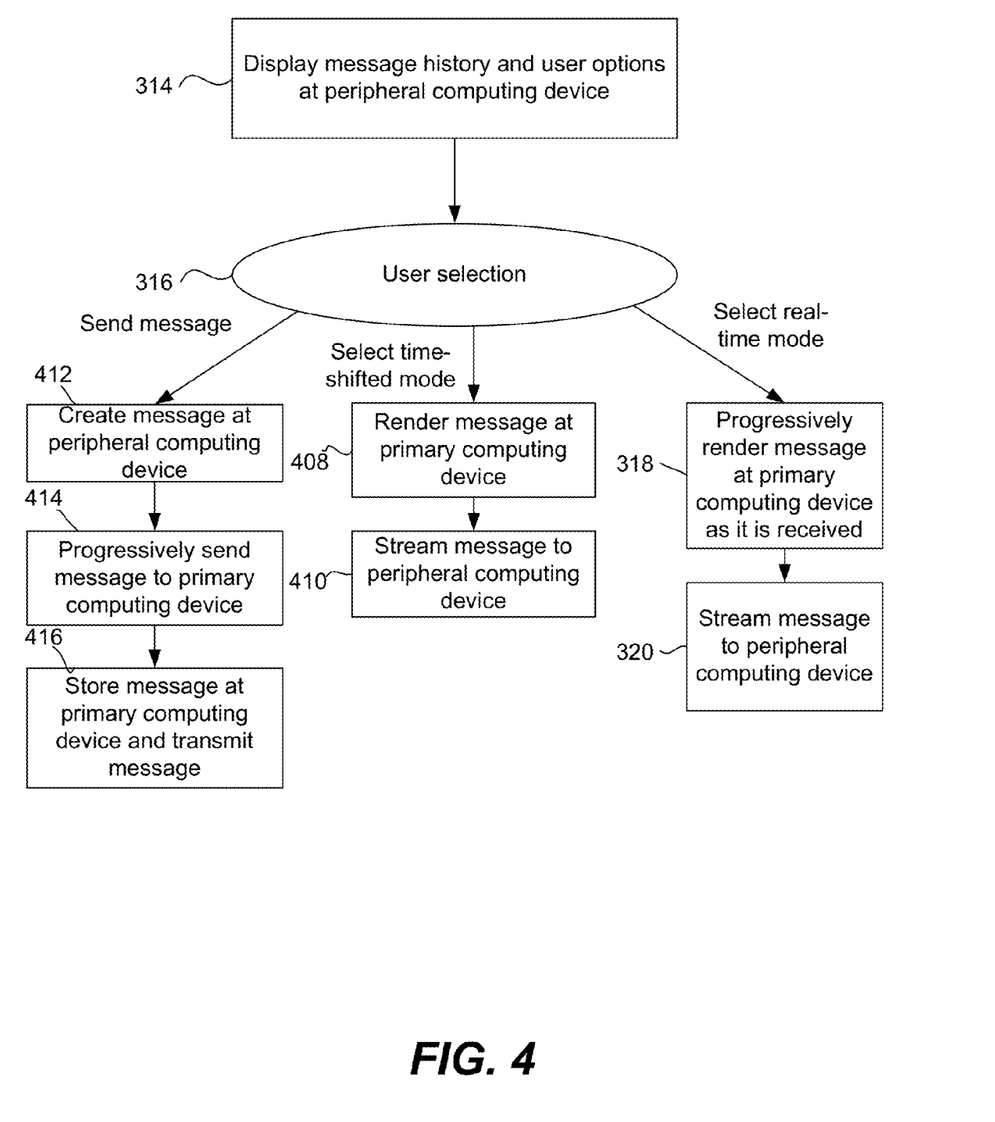

Referring next to FIGS. 3 and 4, a method 300 for using a peripheral computing device 112 and a primary computing device 104b will be described. Initially, at step 302, the primary computing device 104b monitors for incoming messages. In step 304, a message (e.g., voice media, video media, a Vox, etc.) is received at the primary computing device 112 (e.g., as in FIG. 1). In this example, the primary computing device then progressively and persistently stores the message while it is being received (step 306).

The primary computing device 104b also detects whether the peripheral computing device 112 is connected to the primary computing device 104b (step 308). This connection may be made using any known network protocol or short range network system, such as BLUETOOTH. If a connection exists, the primary computing device 104b sends a signal to the peripheral computing device 112 through the short range network. In response to the signal, the peripheral computing device 112 displays an alert at the peripheral device 112 that indicates to a user that a message has arrived (step 310).

An example of such an alert is shown in FIG. 5. FIG. 5 is a block diagram illustrating an example user interface 500 on a peripheral computing device 112 according to a particular embodiment of the present invention. The user interface 500 is displaying an alert using display element 204. The user interface includes an alert 510, a sender identification element 502, a location element 508, an ignore option 504 and a connect option 506. In this example, the alert 510 notifies the user that a person ("Jill Wright") is trying to contact the user. The alert may include additional information, such as a sender identification element 502 that provides further information relating to the sending party (e.g., a photo of the sending party) and a location element 508 that provides further information on the party's location (e.g., an address, location, or an image of a map that indicates where the message is currently coming from.) The interface design and notification style may vary widely, depending on the needs of a particular application. For example, if the peripheral computing device 104b includes a display or capacitive screen, the interface will be displayed on that screen. If the peripheral device uses a heads up display, the interface may be projected onto a suitable medium (e.g., a prism, a lens for glasses, a sheet, a screen, a windshield, etc.)

Returning to FIG. 3, after having seen the alert on the peripheral computing device 112, the user then determines whether they wish to participation in a conversation with the sending party (step 312). This decision may be expressed in a variety of ways. For example, in a peripheral computing device 112 with a motion sensor, participation can be triggered using a suitable motion of the device (e.g., a wave, twist or raising of the device, a repositioning of the device near the head, etc.) Some applications contemplate triggering participation through an audio command (e.g., the user saying a particular word or phrase into a microphone of the device.) In the example illustrated in FIG. 5, the interface 500 offers selectable options to the user, including an ignore option 504 and a talk or connect option 506. In some embodiments, these options appear on a touch sensitive screen and may be selecting by physically touching the options.

If the user decides not to participate in the conversation (e.g., by pressing the ignore option 504), the peripheral computing device 112 sends a corresponding control signal to the primary computing device 104b. The primary computing device 104b continues to receive and progressively store the message and returns to monitoring for additional messages (step 302). This may also automatically take place after a predetermined amount of time if the user takes no action in response to the alert.

If the user elects to participate in a conversation with the sending party (e.g., by selecting the connect option 506), the peripheral computing device 112 offers additional options and information to the user. In some implementations, for example, the peripheral computing device 112 requests message history data from the primary computing device 104b. That is, since the peripheral computing device 104b stores incoming and outgoing messages, it is able to build up a library or history of communications between various parties. Upon request, the primary computing device 104b provides this message history to the peripheral computing device 112 for viewing by the user (step 314).

An example of such a message history is displayed in FIG. 6. FIG. 6 includes a user interface 600 that is displayed using display element 204 after the connect option 506 of FIG. 5 has been selected. The user interface 600 includes a message history 602 and a sender identification element 604. The sender identification element 604 identifies the sending party ("Jill Wright.") The message history 602 includes a series of visual representations or message bubbles 606 that each represents a particular incoming or outgoing message. In the illustrated embodiment, the message bubbles 606 are arranged in chronological order and each message bubble identifies the sending party and optionally the time/date that the message took place and/or a summary or excerpt of the message. Different types of messages (e.g., voice media, text, images, video media, etc.) may be mixed together in the same message history 602.

Referring now to FIG. 4 (which continues the method 300 of FIG. 3), the user interface 600 and message history 602 provides the user with a variety of additional selectable options (step 316). In this example, one option is to select a real-mode communication mode. In other words, the user can elect to listen to the incoming message in (near) real time. In various embodiments, this option is selected automatically after the user decides to participate in a conversation with the sending party (step 312 of FIG. 3.) In other embodiments, the user must take an action (e.g., press a suitable button or location on the interface 600 of FIG. 6, gesture with the device 112 and/or issue an audible command, etc.) to select this option. If this option is selected, the peripheral computing device 112 communicates the selection to the primary computing device 104b. The primary computing device 104b continues to progressively store the incoming message as it is being received. The device 104b renders the message out of storage (step 318) and progressively transmits the message to the peripheral computing device 112 while receiving and storing the message (step 320). The media is then played at the peripheral computing device 112 (e.g., an audio message can be played out of a speaker 214 on the device 112, or a movie can be displayed using the display element 204, etc.) for consumption by the user. Since the rendering and consumption of the message occurs concurrently with the receiving and storing of the message, the rendering of the message occurs in near real time and the user can review a message as it is being created and transmitted by the sending party.

Various applications use the peripheral computing device 112 as a passive device that acts as a viewing screen and/or speaker for the primary computing device 104b. That is, the primary computing device 104b does the work of rendering the media and simply transmits the rendered media to the peripheral computing device 112 for playing e.g., similar to how a conventional desktop computer might play music or video through headphones or a standard monitor. In this approach, the peripheral computing device 112 does not persistently store the media and the primary computing device 104b handles the progressive storage of the incoming message. In other embodiments, however, the peripheral computing device 112 is also involved in the rendering of the message and/or progressively stores the message as it is being received.

Returning to the user selection step 316, the user may also select a time-shifted mode. That is, the user may elect to review or listen to messages that were recorded in the past. This selection may be made in a wide variety of ways. In the illustrated embodiment of FIG. 6, for example, the user can physically press on one of the message bubbles 606 displayed in the interface that corresponds to a past audio message. In other embodiments, the user can select a desired message using a mechanical button, an audio command or by some other means.

When the user selects a message for playback, the peripheral computing device 112 sends a signal to the primary computing device 104b indicating this selection. The primary computing device 104b then locates the desired message and renders it out of storage (step 408). The message is then transmitted or streamed to the peripheral computing device 112 (step 410), so that it can be displayed on a display element 204 (in the case of a video) or heard over a speaker 214 (in the case of audio media.)

Returning again to the user selection step 316, another option available to the user is to create a message for delivery to the sending party. The user can select this option in a variety of ways, depending on the design of the peripheral computing device 112. In the illustrated embodiment of FIG. 6, for example, this selection is triggered by a user touching the talk option 608 on the display (as indicated by the dotted circle). Additionally or alternatively, the user can select this option using an audio command or by waving or moving the peripheral computing device in a particular manner.

Once the user has provided the above input to the peripheral computing device, the peripheral computing device 112 activates a media recording tool 216, such as a camera (for video recording) and/or a microphone (for audio recording.) The user can then record his or her voice or surroundings to create the message (step 412). As the message is being created, it is progressively streamed to the primary computing device 104b (step 414). The primary computing device progressively stores the message as it is being created and received (step 416). The primary computing device 104b progressively transmits the message to the intended recipient (e.g., primary computing device 104a of FIG. 1) as it is being created, received and stored. In the example of FIG. 4, the intended recipient is Jill Wright, or the sending party who delivered the original message (step 304) and who is participating in the conversation that corresponds to the message history 602.

In some embodiments, the peripheral computing device 112 periodically receives message-related data (e.g., incoming and outgoing messages, message history, conversations, etc.) from the primary computing device 104b and stores it in the storage element 204. This may take place automatically i.e., even if the user of the peripheral computing device 112 has not specifically requested the transfer. As a result, when a user uses the peripheral computing device 112 to view the message history (e.g., step 314) or to play a message (steps 408 and 410), the desired data can be obtained and/or rendered locally and does not require sending a request for a data transfer to the primary computing device 104b. This can help expedite the viewing of the message-related information.

It should be appreciated that any operation described in the present application may be activated or triggered in a wide variety of ways, including touch, mechanical buttons, audio commands or motion. For example, various motion sensing techniques are discussed in U.S. Provisional Patent Application No. 61/833,645 (hereinafter the '645 application.) These techniques may be integrated into the embodiments described herein. By way of example, the '645 application discusses techniques for analyzing motion data and determining whether a particular motion took place or whether a toggle threshold has been exceeded. The present invention contemplates using such techniques to determine whether a user has elected to participate in an incoming call or conversation (step 312.) Motion may also be used to trigger a selection of a real-time mode (steps 318 and 320), time-shifted mode (steps 408 and 410) and/or the creation of a message (steps 412, 414 and 416). That is, these steps may be triggered by motion without requiring any further involvement or action by the user.

The present application describes a primary computing device 104b that communicates with and works in conjunction with the peripheral computing device 112. The primary computing device 104b may take a wide variety of forms, depending on the needs of a particular application. In various embodiments, for example, the primary computing device is a mobile device or smartphone, a computer, a laptop or any other suitable device. The primary computing device 104b may be running a known mobile operating system, such as ANDROID or IOS. Some designs involve a primary computing device 104b that includes a processor, a storage element (for persistently storing messages) and a computer readable medium that, when executed by the processor, is configured to perform the operations described in this application. The primary computing device 104b may contain any feature or component of the peripheral computing device 112 as well as any feature or component of the devices and clients described in the co-assigned '034 and '011 applications.

Although only a few embodiments of the invention have been described in detail, it should be appreciated that the invention may be implemented in many other forms without departing from the spirit or scope of the invention. For example, FIGS. 3 and 4 illustrate various steps and operations. It should be appreciated that these steps need not be performed in exactly the described order or manner. Some embodiments contemplate removing, reordering, replacing or modifying one or more of the steps. Also, the present application describes various user interface designs for the peripheral computing device. These features are not limited to what is expressly described herein. For example, co-assigned U.S. Pat. No. 8,321,582 (hereinafter referred to as the '582 patent), which is incorporated herein its entirety for all purposes, describes a variety of interface designs and features that may be implemented in the interfaces 500 and 600 described in FIGS. 5 and 6. Therefore, the present embodiments should be considered as illustrative and not restrictive and the invention is not limited to the details given herein, but may be modified within the scope and equivalents of the appended claims.

What is claimed is:

1. A peripheral computing device comprising:
a processor;
a network element configured to connect the peripheral computing device with a primary computing device, the primary computing device being arranged to receive and transmit messages including voice data over a network, the primary computing device being further arranged to progressively store messages as they are received;
a speaker;
a computer readable storage medium that includes executable computer code embodied in a tangible form, wherein the code, when executed by the processor, is configured to:
   obtain a message history from the primary computing device, the message history indicating incoming and outgoing messages at the primary computing device that represent a conversation between participants;
   display the message history on the peripheral computing device, the message history including visual representations of the incoming and outgoing messages;
   provide an option for a user to select a real time mode;
   in response to the user selection of the real time mode, cause the primary computing device to send the incoming message to the peripheral computing device for playing through the speaker while the incoming message is being received over the network and progressively stored at the primary computing device; and
   provide an option for a user to select a time-shifted mode; and
   in response to the user selection of the time-shifted mode, play a message that was previously stored on the primary computing device over the speaker of the peripheral computing device.

2. The peripheral computing device of claim 1, wherein the peripheral computing device is at least one selected from the group consisting of: a wearable device, a watch with a display, a display device, a device mounted on a dashboard of a vehicle, a heads up display projector, computer glasses and a head-mounted display.

3. The peripheral computing device of claim 1, wherein the message history includes a plurality of message bubbles, each message bubble representing an incoming or outgoing message.

4. The peripheral computing device of claim 3, wherein the code, when executed by the processor, is further configured to:
   enable a user to select one of the message bubbles;
   in response to the message bubble selection, cause the primary computing device to render a message out of storage that corresponds to the selected message bubble and to transmit the selected message to the peripheral computing device for playing out of the speaker.

5. The peripheral computing device of claim 4, wherein the user selection of one of the bubbles is triggered by physically touching the message bubble displayed on a touch sensitive display of the peripheral computing device.

6. The peripheral computing device of claim 3, wherein each message bubble identifies a sender of the message corresponding to the message bubble.

7. The peripheral computing device of claim 1, wherein the code, when executed by the processor, is further configured to enable the user to move almost seamlessly between the time-shifted mode and the real time mode by selecting different options displayed together with the message history on an interface of the peripheral computer device.

8. The peripheral computing device of claim 1, wherein in the real-time mode, the message is rendered out of storage and sent from the primary computing device to the peripheral computing device and wherein the message is not rendered at the peripheral computing device.

9. The peripheral computing device of claim 1, wherein in the real-time mode, the message is progressively transmitted to and stored at the peripheral computing device while it is being received over the network at the primary computing device.

10. The peripheral computing device of claim 1, wherein in the real time mode, the code, when executed by the processor, is further configured to:
   detect when a message has arrived at the primary computing device; and
   display a notification at the peripheral computing device indicating that that the message has arrived.

11. The peripheral computing device of claim 10, wherein the incoming message notification further indicates at least one selected from the group consisting of: 1) a sender of the incoming message; and 2) a location from which the sender is sending the message.

12. The peripheral computing device of claim 1, wherein the code, when executed by the processor, is further configured to:
provide an option for a user to select a talk mode;
in response to the user selection of the talk mode, the code is configured to perform the following:
(i) create media at the peripheral computing device using a camera or microphone on the peripheral computing device;
(ii) progressively transmit the media to the primary computing device;
(iii) cause the primary computing device to progressively store the media as it is being created and transmitted; and
(iv) cause the primary computing device to progressively send the media over the network as it is being created and transmitted from the peripheral computing device.

13. The peripheral computing device of claim 1, wherein the code, when executed by the processor, is further configured to:
detect motion of the peripheral computing device using a motion detector in the peripheral computing device;
determine whether the motion meets a particular predefined motion criteria;
if the motion meets the motion criteria, activate a feature of the peripheral computing device.

14. The peripheral computing device of claim 13, wherein the feature activated by the motion of the peripheral computing device is at least one selected from the group consisting of: 1) enabling the peripheral computing device to record media created by a user for sending over the network via the primary computing device; and 2) enabling a user to enter the real time mode and listen to an incoming message that has arrived at the primary computing device.

15. A system for managing media communications using primary and peripheral computing devices, the system comprising:
the peripheral computing device of claim 1; and
the primary computing device, the primary computing device arranged to transmit and send messages and store the incoming and outgoing messages such that the messages form the message history, the primary computing device being configured to:
receive a message over the network from one or more other participants in the conversation;
progressively store the message as it is being received;
detect whether the peripheral computing device is connected with the primary computing device;
determine whether a user of the peripheral computing device has selected the real time mode;
determine whether a user of the peripheral computing device has selected the time shifted mode;
when it is determined that the peripheral computing device is connected and the user has selected the real time mode, render the message out of storage and progressively transmit it to the peripheral computing device while the message is being received; and
when it is determined that the peripheral computing device is connected and the user has selected the time-shifted mode, render a message that has been selected by the user and that has been stored at the primary computing device so that the message is played over the speaker of the peripheral computing device.

16. A method for media management, the method comprising:
detecting, at a peripheral computing device, that a message has arrived at a primary computing device that is connected to the peripheral computing device wherein the primary computing device is arranged to engage in bidirectional communication with one or more other devices over a network;
obtaining a message history at a peripheral computing device from the primary computing device, the message history indicating incoming and outgoing messages at the primary computing device that represent a conversation between participants;
displaying the message history on the peripheral computing device, the message history including visual representations of the incoming and outgoing messages;
providing an option for a user to select a real time mode;
in response to the user selection of the real time mode, causing the primary computing device to progressively send the incoming message to the peripheral computing device for playing through the speaker while the incoming message is being received over the network and progressively stored at the primary computing device; and
providing an option for a user to select a time-shifted mode; and
in response to the user selection of the time-shifted mode, play a message that was previously stored on the primary computing device over the speaker of the peripheral computing device.

17. The method of claim 16, further comprising:
displaying an option at the peripheral computing device that allows a user to select one of a plurality of visual representations, each visual representation representing one of the incoming and outgoing messages; and
in response to the visual representation selection, causing the primary computing device to render a message out of storage that corresponds to the selected visual representation and to transmit audio for the selected message to the speaker of the peripheral device.

18. The method of claim 16, further comprising:
providing an option at the peripheral computing device for a user to select a talk mode;
in response to the user selection of the talk mode, creating media at the peripheral computing device using a camera or microphone on the peripheral computing device;
progressively transmitting the media to the primary computing device as it is being created;
causing the primary computing device to progressively store the media as it is being created and received from the peripheral computing device; and
causing the primary computing device to progressively send the media over the network as the media is being created and received.

19. The method of claim 16, further comprising:
detecting motion of the peripheral computing device using a motion detector in the peripheral computing device;
determining whether the motion meets predefined motion criteria;
if the motion meets the motion criteria, activating a feature of the peripheral computing device.

20. The method of claim 19, wherein the feature activated by the motion of the peripheral computing device is at least one selected from the group consisting of: 1) enabling the peripheral computing device to record media created by a user for sending over the network via the primary computing device; and 2) enabling a user to enter the real time mode and review an incoming message that has just arrived at the primary computing device.

* * * * *